Oct. 20, 1959

G. ABRAHAM 2,909,679

HALL EFFECT CIRCUIT EMPLOYING A STEADY STATE OF CHARGE CARRIERS

Filed Feb. 4, 1957

4 Sheets-Sheet 1

INVENTOR
GEORGE ABRAHAM

BY W R Maltby
Richard C Reed

ATTORNEYS

INVENTOR
GEORGE ABRAHAM

BY W R Mattox
Richard C Reed
ATTORNEYS

Oct. 20, 1959 G. ABRAHAM 2,909,679

HALL EFFECT CIRCUIT EMPLOYING A STEADY STATE OF CHARGE CARRIERS

Filed Feb. 4, 1957 4 Sheets-Sheet 3

INVENTOR
GEORGE ABRAHAM

BY W R Maltby
Richard C Reed ATTORNEYS

INVENTOR
GEORGE ABRAHAM

BY W. R. McCatty
Richard C. Reed
ATTORNEYS

United States Patent Office 2,909,679

Patented Oct. 20, 1959

2,909,679

HALL EFFECT CIRCUIT EMPLOYING A STEADY STATE OF CHARGE CARRIERS

George Abraham, Washington, D.C.

Application February 4, 1957, Serial No. 638,181

4 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

The present invention relates in general to electrical signaling translating circuits and in particular to multistable circuits.

In the field of electronics, a multistable circuit may find many useful applications. By way of example, in a counter, a plurality of multistable circuits, connected in tandem, may be used when it is desired to count pulses occurring either at regular intervals or at random. At present, counters employing conventional bistable circuits have a number of disadvantages. For example, to obtain only two stable states, these circuits usually require a complicated arrangement using two transistors or two electron tubes. Thus, if several multistable circuits are utilized in a single counter, the physical size and weight of the counter will be appreciable. If electron tubes are used, the power consumption will be high and a large portion of the power supplied to the counter, because of the low efficiency, will be dissipated as heat.

In accordance with the foregoing, it is an object of the present invention to provide a multistable circuit having a plurality of stable states and requiring a negligible amount of power.

Another object of the present invention is to provide a multistable circuit utilizing a nonlinear device that is simple to manufacture and does not require the precise positioning of delicate contacts as in a conventional diode or transistor.

Another object of the present invention is to provide an arrangement in which a single magnetic field may be used to control a plurality of nonlinear devices that are employed in a multistable circuit.

Another object of the present invention is to provide an arrangement wherein an appropriate slab of material may be formed to constitute several nonlinear devices when connected in a predetermined circuit under control of a single magnetic field.

Another object of the present invention is to provide a multistable circuit in which a source of dynamic B+, a magnetic field and a source of potential are applied to a slab of material to cause the storage of a steady state of electrical charge carriers in the slab and thereby obtain a voltage controlled negative resistance curve on which two stable states of operation may be located.

Other objects and many of the attendant advantages of this invention will be readily apparent as the same become better understood when considered in connection with the accompanying drawings in which:

Fig. 1 discloses a first embodiment of the present invention;

Fig. 2 discloses a second embodiment of the present invention;

Figures 1, 2:
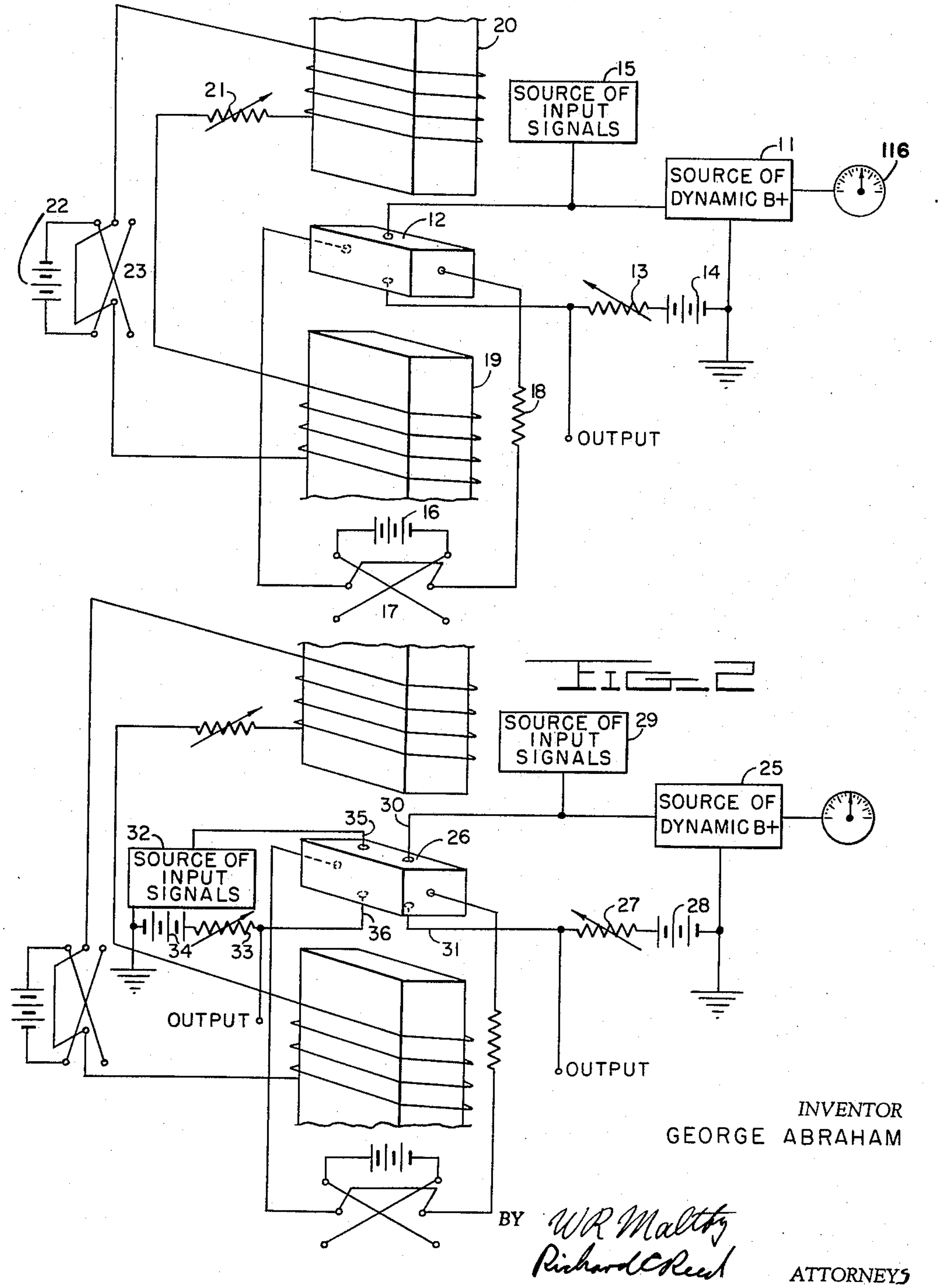
Figure 8:
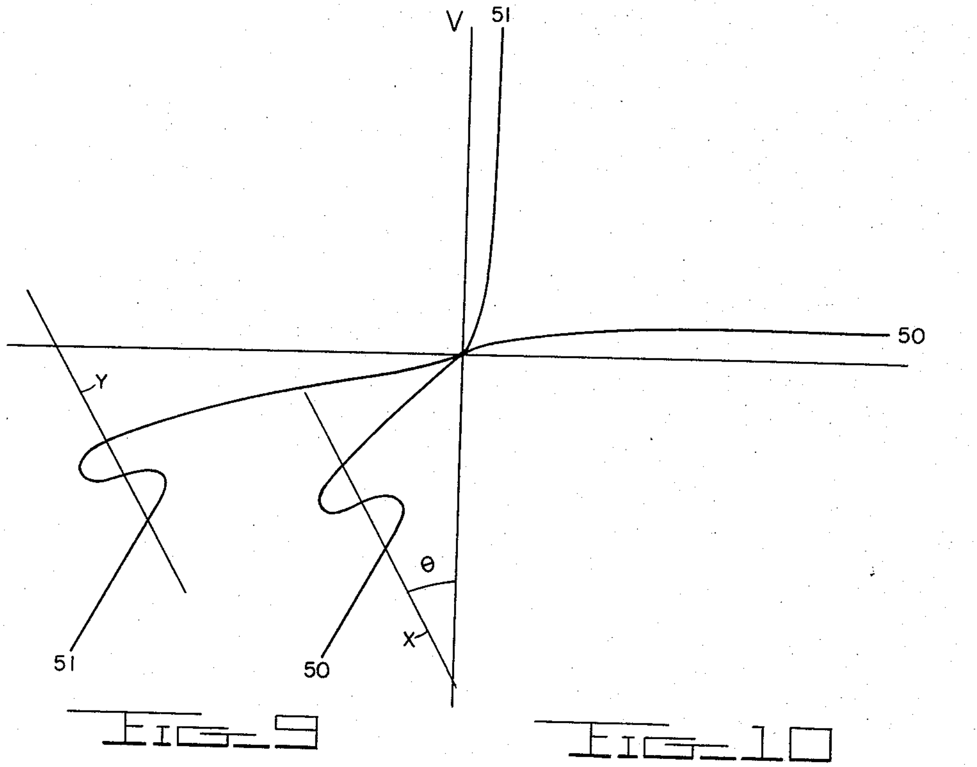
Figure 9:
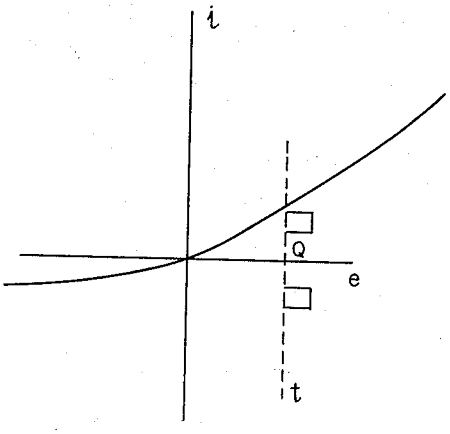
Figure 10:
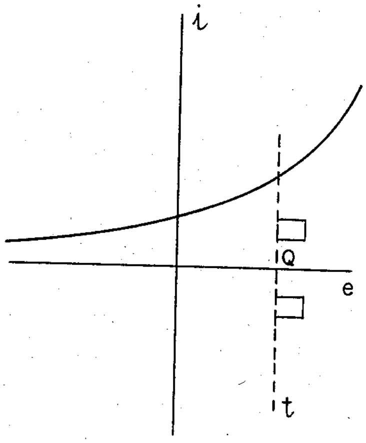

Fig. 8 represents a first load line drawn on one negative resistance curve obtained when the magnetic field or source of potential is applied to the slab of material in a first direction, and a second load line drawn on a second negative resistance curve obtained when the magnetic field or source of potential is applied to the slab of material in a direction opposite to that of the first direction;

Fig. 9 represents a static resistance curve of the slab of material shown in Fig. 1; and Fig. 10 represents a static capacitance characteristic curve of the slab of material shown in Fig. 1.

As used in the present application, "dynamic B+" is defined as a periodically varying potential applied to a selected nonlinear device to store energy therein and to enable the device to function as an amplifier and/or to exhibit a negative resistance characteristic. As an example, a source of dynamic B+ may be a source of recurring signals providing signals having a frequency or repetition rate greater than the reciprocal of electrical charge carriers injected into the variable impedance device to which the source of dynamic B+ is connected.

In accordance with the present invention, a multistable circuit is provided wherein a source of potential is applied to a slab of material having desired properties to induce a drift field in the slab; and a magnetic field is applied to the slab to convert the slab of material to a nonlinear impedance device. A source of dynamic B+ is also applied to the slab of material to inject electrical charge carriers into the slab at a rate greater than the electrical charge carriers decay due to recombination to maintain a steady state of electrical charge carriers in the slab of material. The magnetic field or source of potential is applied in a first direction so that when a desired magnitude of steady state is stored in the slab a voltage-controlled negative resistance curve is obtained having two stable states of operation; and the magnetic field or source of potential is applied in a second direction to obtain another voltage-controlled negative resistance curve in which two more stable states of operation may be located. The multistable circuit thus obtained may be triggered to a desired stable state in several ways such as by varying the relative amplitude, phase, or width of pulses applied to a selected element of the slab of material or by varying the bias, optically, or by varying the impedance load on the slab, or by varying the frequency amplitude or phase of the dynamic B+ applied to the slab or by varying the magnitude or direction of magnetic field applied to the variable impedance device, or by varying the direction in which the source of potential or magnetic field is applied to the slab of material. For example, triggering from a first stable state to a second stable state may be accomplished by applying an electromagnetic field of proper polarity and proper amplitude for a given load line to the slab of material and a field of reverse polarity and the same magnitude will trigger the multistable circuit from the second to the first stable state.

Referring to Fig. 1, it is noted that a source of dynamic B+ 11 is connected in series with a slab of material 12, variable resistor 13 and a source of direct current voltage 14. One element of slab of material 12 is connected through a unilateral conducting junction and the other through a bilateral conducting junction. The source of dynamic B+ 11 may be controlled manually with knob 11*b* to vary such parameters as frequency, phase, duration, and magnitude. The output of the multistable circuit is connected across variable resistor 13 and a source of input signals 15 is connected to a first element of the slab of material 12. It is, of course, understood that the source of input signals 15 could be connected to the second element of the slab of material 12 instead of to the first. A second source of direct current voltage 16 is connected through double-pole, double-throw switch 17 in series with resistor 18 and across the longitudinal axis of slab 12. The connections to the longitudinal axis of slab 12 are bilateral conducting junctions. Cores 19 and 20 are provided with appropriate coils that are connected in series with variable resistor 21 and a source of direct current voltage 22, the latter connected in the circuit through double-pole, double-throw switch 23. Cores 19 and 20 are positioned across the transverse axis of slab 12 and the direction of current flow through the coils on the cores is such that the electromagnetic field passing through the slab will go into the plane of the drawing for one position of double-pole, double-throw switch 23 and will come out of the plane of the drawing for the other position. It is, of course, understood that instead of an electromagnetic field, a magnetic field of appropriate strength set up by permanent magnets could be used as well in the arrangement shown in Fig. 1.

Referring to Fig. 2, it is noted that a source of dynamic B+ 25 is connected in series with a slab of material 26, variable resistor 27, and source of direct current voltage 28. Element 30 is connected to the slab through a unilateral conducting junction and element 31 is connected through a bilateral conducting junction. The output is connected across variable output resistor 27 and a source of input signals 29 is connected to element 30 of slab 26. The surface of slab 26 to which element 30 is connected and the surface of the slab to which element 31 is connected are fabricated and treated in such a manner as to give the portion of the slab between these two elements desired electrical properties. A source of input signals 32 is connected in series with slab 26, variable resistor 33, and source of direct current voltage 34. Element 36 is connected to slab 26 through a bilateral conducting junction and element 35 is connected through a unilateral conducting junction. The surface of slab 26 to which element 35 is connected and the surface to which element 36 is connected are also fabricated and treated to give the portion of the slab between these two elements predetermined properties. The properties of slab 26 between elements 30 and 31 and between elements 35 and 36 may be the same or different, as desired, and there will be no interaction between the two as long as the distance between the two sets of elements is of the order or greater than ten times the thickness of slab 26. The thickness of the slab should be small compared to the diffusion length. Further, it is understood that any number of sets of elements could be located on slab 26, limited only by the dimensions of the slab, and that instead of a single slab with several sets of elements, several slabs each with a single set of elements could be used. A comparison between Figs. 1 and 2 will indicate that the remaining components in Fig. 2 are the same in construction and orientation as those shown in Fig. 1.

In the embodiment of the present invention shown in Figs. 1 and 2, the slab of material may be any unit of N-type or P-type material having a conductivity of the order of 20 ohm-cm. The thickness of the slab should be small compared with the diffusion length. Surface and volume recombination should be small. The length and width of the slab may be any desired dimensions depending upon the number of elements to be located on the surfaces of the slab. Any two opposite surfaces or portions of opposite surfaces of the slab may be treated in different ways. For example, one surface may be etched and the other surface sand-blasted so that the surface recombination velocity (how fast recombination of electrical charge carriers occurs at the surface) and the corresponding lifetime of electrical charge carriers near each surface will be different.

Figure 4:
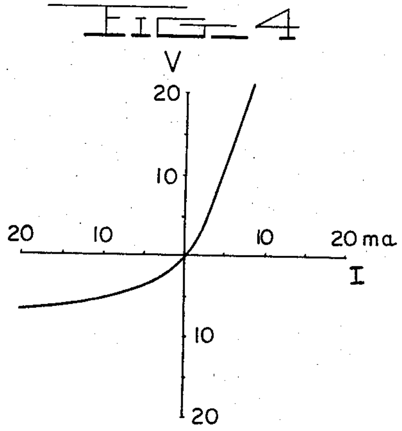
Fig. 4 represents the voltage-current characteristic curve of the slap of material shown in Fig. 1 when no dynamic B+ is applied and the magnetic field is applied in a first direction.
Figure 5:
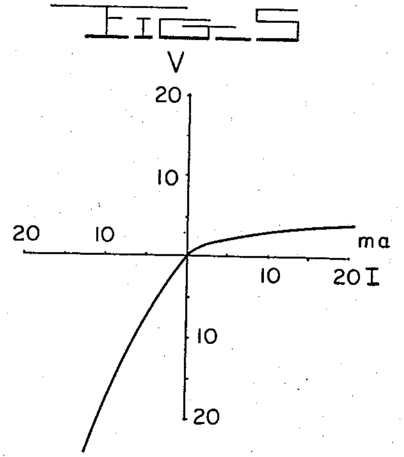
Fig. 5 represents the voltage-current characteristic curve of the slab of material shown in Fig. 1 when no dynamic B+ is applied and the magnetic field is applied in a direction opposite to that of the direction in Fig. 4.

When the slab is treated in this manner, if a magnetic field of proper polarity is applied across the two treated surfaces of the slab and a source of direct current voltage is applied across the other two surfaces, electrical charge carriers will be swept to the two treated surfaces where they will recombine at different velocities to render the unit non-symmetrical. The slab of material will then have a nonlinear voltage-current characteristic similar to a variable impedance device such as a conventional diode. This is illustrated in Figs. 4 and 5 wherein Fig. 4 represents the nonlinear voltage-current characteristic of the slab of material when no dynamic B+ is applied and the magnetic field is applied to the slab of material in a first direction and Fig. 5 represents the slab voltage current characteristic when no dynamic B+ is applied and the magnetic field is applied in a direction opposite to the first direction. It is apparent that if a single slab is used whereon several sets of elements are located if the portion of the surface between each set is treated differently the resulting voltage current characteristic between each set of elements will be different.

The magnetic field shown in Fig. 1 may be established by any conventional means that will give a strong enough field to deflect electrical charge carriers to the two treated surfaces. The strength of the field required will be dependent on the type of material used in the slab. By way of example, a field of 10,000 gauss will be required for a slab of germanium.

The source of dynamic B+ may be any source of recurring signals so long as the frequency or repetition rate of the recurring signals is greater than the reciprocal of the lifetime of injected electrical charge carriers, and so long as one element of each pair of elements on the slab is driven positive with respect to another element of the pair during each cycle of operation. The source of potential used to induce a drift field may be a source of direct current voltage. It should be understood that a drift field is defined as one in which electrical charge carriers are given a certain velocity in accordance with the following relationship:

Imparted velocity=drift
Mobility $x$ applied electric field

The injected electrical charge carriers will move in a direction that is controlled by the relationship between polarity of the applied field, which is applied by a source of potential, and the type of the electrical charge carrier.

In the embodiment of the present invention shown in Fig. 1 the slab is of N-type material that is sand-blasted on one side and etched on the other. In Fig. 2 the slab is of N-type material and the portions of the surfaces between each set of elements are treated differently. In Figs. 1 and 2, a constant voltage square wave generator, which injects during a portion of the cycle and which has a typical repetition rate of 1 mc. with a 50% duty cycle, is used as a source of dynamic B+. Since in the embodiment shown a slab of N-type material is used, the electrical charge carriers stored in the steady state will be holes. The value of reverse bias and load impedance are selected to give a desired magnitude of stored holes that will result in a predetermined negative resistance. It is understood that other types of sources of dynamic B+ could be used in combination with a selected slab material to maintain a steady state of electrical charge carriers. For example, a high frequency, sine wave oscillator could be used to inject and store electrons in a slab of P-type material.

In the operation of the multistable circuit shown in Fig. 1, the source of dynamic B+11 is applied to the slab of material 12; and after a few cycles of operation, the number of holes stored in the slab of material reach a steady state. Double-pole, double-throw switch 23 is then thrown to a first position and signals are applied from the source of input signals 15 to a selected element of the slab of material to trigger the multistable circuit to one of two stable states located in regions of operation determined by the first position of the double-pole, double-throw switch. If it is desired to operate the multistable circuit in one of two other regions of operation, double-pole, double-throw switch 23 is thrown to its other position and an appropriate signal is applied to the slab of material 12 from the source of input signals 15. It is understood that a selected one of the other modes of triggering indicated above could be used to trigger the multistable circuit to a desired stable state of operation and that double-pole, double-throw switch 23 could be replaced with a variety of conventional switching devices and/or circuits. The output, as shown in Fig. 1, is derived across variable resistor 13.

The operation of the circuit shown in Fig. 2 is similar to that of the circuit shown in Fig. 1 except that two sources of input signals 29 and 32 are used to each control its associated circuit to trigger the multistable circuit to one of four stable states. Thus, the multistable circuit disclosed in Fig. 2 may be triggered to one of eight stable states.

In order to understand the operation of the multistable circuit shown in Fig. 1 or 2, it is necessary to appreciate the relationship between several factors that effect the number of holes stored in the steady state. These factors may be listed as follows: the impedance of the slab of material, the load impedance, the bias, the parameters of the source of dynamic B+ such as frequency, magnitude, phase and duration, and the strength and polarity of the electromagnetic field and the drift field.

As indicated above, the number of holes that will be stored in an N-type slab of material when operated in the circuits of Fig. 1 or 2 will be determined in part by the internal impedance of the material, i.e., by the barrier capacitance, barrier-resistance, base capacitance, and base resistance of the slab of material. As will be explained presently, the impedance of the slab of material is not static but varies with or is modulated by the dynamic B+ applied to the slab. The impedance of the slab is dependent in part on such factors as the lifetime of the electrical charge carriers, and the diffusion length of electrical charge carriers in the slab material. These factors in turn are determined by the material used and the process of manufacture of the slab material. The internal impedance is also dependent in part on the conditions under which the slab of material is operated in a particular circuit. This will become apparent during the analysis of Figs. 3B, 3C and 3D which, it will be recalled, represent the equivalent circuit of a slab of material before, during and immediately after the application of dynamic B+ when a magnetic field of proper magnitude is applied to the slab.

Figure 3A:
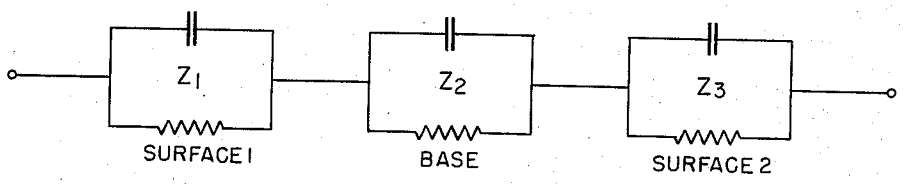
Fig. 3A represents the static equivalent circuit diagram of the slab of material employed in the embodiment shown in Fig. 1 before the application of either a magnetic field or dynamic B+.
Figure 3B:
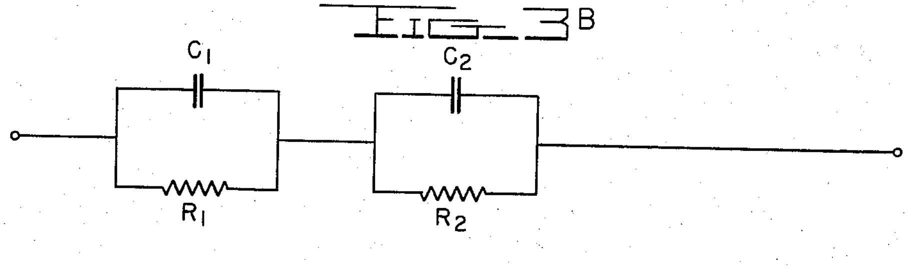
Fig. 3B represents the equivalent circuit diagram of the slab of material during the application of the magnetic field but before the application of the dynamic B+.

Referring to Fig. 3A, when no magnetic field or dynamic B+ is applied to the slab of material, the slab may be represented as having a junction impedance $Z_1$ in surface 1, an impedance $Z_2$ of the base and a junction impedance $Z_3$ in the surface 2, where the junction impedance may be defined as the impedance of the area in the vicinity of a connection between an element and a surface. The slab will have an essentially linear voltage current characteristic curve. It will be recalled that the particular slab of material selected for the embodiments shown in Figs. 1 and 2 are etched on one surface and sand blasted on the other. When a suitable magnetic field of predetermined direction and polarity is applied to the slab, the electrical charge carriers that are swept to surface 2, since this surface has been sand blasted, will have a high recombination rate. The junction impedance $Z_3$ in this surface will, accordingly, be negligible and may be neglected as shown in Fig. 3B. The two surfaces of the slab are treated in such a manner that when the polarity and direction of the magnetic field are reversed impedance $Z_1$ and not impedance $Z_3$ may be neglected.

Referring to Fig. 3B, when an appropriate magnetic field of desired polarity, say 10,000 gauss, and a source of dynamic B+ are applied to a slab of germanium of N-type material having 15 to 20 ohms-cm. conductivity, typical values of the impedance parameters may be as follows: the capacitance $C_1$ of junction impedance $Z_1$, approximately 0.5 $\mu\mu$f., the resistance $R_1$ of junction impedance $Z_1$, approximately 10,000 ohms, base capacitance $C_2$ of impedance $Z_2$, approximately 2 $\mu\mu$f., and base resistance $R_2$ of impedance $Z_2$ will be approximately 100 ohms. The value of each capacitance and resistance will be determined in part by the particular sample of material used and by the process of manufacture of the material.

Figure 3C:
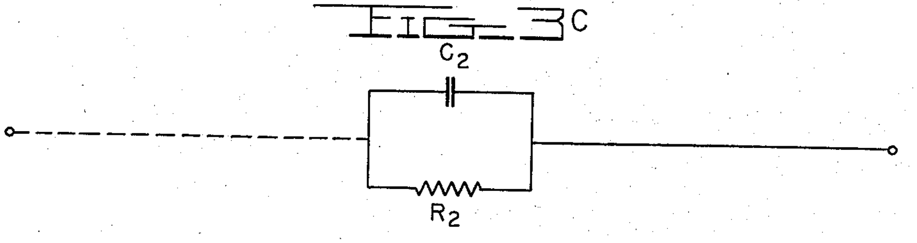
Fig. 3C represents the equivalent circuit diagram of the slab of material during the application of the magnetic field and the dynamic B+.

In the preferred embodiments of the present invention, a large magnitude of square wave dynamic B+ is applied to the slab of material. As the dynamic B+ increases to its positive maximum value, there is considerable diffusion of electrical charge carriers into the base, and the value of the base capacitance $C_2$ becomes relatively large, approximately 800 $\mu\mu$f. The base resistance $R_2$ becomes smaller, approximately 60 ohms, and as shown in Fig. 3C, these values cannot be neglected. The capacitance $C_1$, because of the increased storage of electrical charge carriers, becomes larger, but the resistance $R_1$ approaches zero, shunting out the increased capacitance $C_1$. The capacitance $C_1$ and resistance $R_1$ may, therefore, be neglected as shown in Fig. 3C.

Figure 3D:
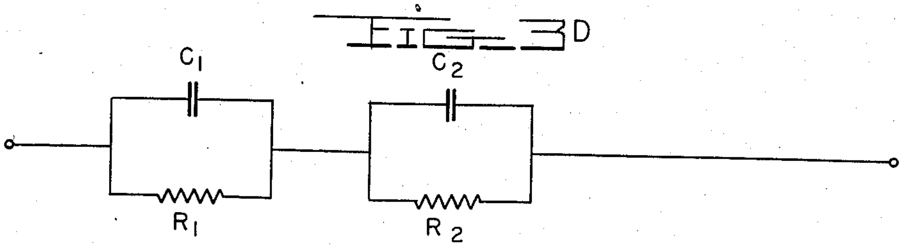
Fig. 3D represents the equivalent circuit diagram of the slab of material during the application of the magnetic field and immediately after the dynamic B+ has been removed from the slab of material.

As shown in Fig. 3D, when the dynamic B+ goes to zero, the capacitance $C_1$ instantaneously returns from the larger value to the smaller value of 0.5 $\mu\mu$f. and the resistance $R_1$ instantaneously returns from approximately zero to 10,000 ohms. The base resistance $R_2$, however, returns slowly from the smaller value of 60 ohms to the larger value of 100 ohms and the base capacitance $C_2$ returns slowly from the larger value of 800 $\mu\mu$f. to the smaller value of 2 $\mu\mu$f. Before the base capacitor $C_2$ can attain its smaller value another cycle of dynamic B+ is applied to the slab of material and tends to return the base capacitance $C_2$ to its larger value. If a series of square waves are applied by the source of dynamic B+ to the slab of material at a frequency greater than the reciprocal of the lifetime of the injected electrical charge carriers, after a few cycles of operation, the base capacitance $C_2$ will attain an average value. The number of electrical charge carriers stored in the base capacitance $C_2$ will, likewise, attain an average value or steady state that will be dependent in part upon the magnitude, duration, and frequency of the dynamic B+ applied to the slab of material.

Referring to Figs. 9 and 10 it is noted that the static resistance and static capacitance characteristics of the slab of material are nonlinear and that the quiescent value Q of the resistance and capacitance are dependent upon the bias applied to the slab. The dynamic capacitance and the dynamic resistance characteristic of the slab will also be nonlinear and similar in shape to the curves for the respective static characteristic but the shape of the dynamic curves will also be dependent on dynamic operating conditions such as the number of holes stored in the steady state, the load and bias applied to the slab as well as the characteristic of the slab of material itself. For example, the steepness of the dynamic capacitance curve will be increased for a given bias as the number of holes stored in the steady state is increased. However, for the static characteristic curves shown in Figs. 9 and 10 it is seen that when dynamic B+ is applied to the slab of material, the capacitance and resistance vary in dependency upon the magnitude of the dynamic B+. Similar relationships exist between the magnitude of the dynamic B+ and the dynamic capacitance and resistance of the slab, and these relationships determine in part the magnitude of the steady state as explained in connection with Figs. 3B, 3C, and 3D.

The number of electrical charge carriers stored in the steady state is dependent in part upon the value of the load impedance and consequently may be varied by changing the value of load impedance. Hence, in the embodiment shown in Fig. 1, for example, the magnitude of the steady state may be controlled by variable resistor 13.

The number of electrical charge carriers stored in the steady state will effect the shape of the voltage current characteristic curve of slab of material 12 when operated in the circuit shown in Fig. 1.

Figure 6:
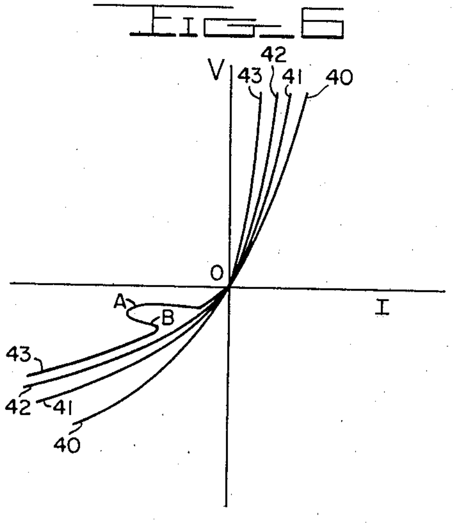
Fig. 6 represents a family of voltage current characteristic curves including a negative resistance curve of the slab of material shown in Fig. 1 when the magnetic field is applied in the first direction.

Referring to Fig. 6, the voltage-current characteristic curve shown in this figure may be obtained when slab of material 12 is employed in the multistable circuit shown in Fig. 1 and double-pole, double-throw switch 23 is in the first position. Curve 40 represents the voltage characteristic curve of the slab of material 12 when the magnitude of dynamic B+ applied to the slab of material is zero. Curve 41 represents the voltage-current characteristic when a relatively small magnitude of dynamic B+ is applied and curves 42 and 43 represent the voltage current characteristic when the relative magnitude of dynamic B+ is increased, the magnitude of dynamic B+ applied to obtain curve 43 being greater than the magnitude applied to obtain curve 42. It is noted that as the magnitude of dynamic B+ is increased, the conductivity of the slab of material 12 increases, i.e., the current load through the slab of material, per unit of voltage applied, increases. This is, in effect, equivalent to feedback which results in regeneration and is attributed to the storage of electrical charge carriers. Thus, in the circuit shown in Fig. 1, as the magnitude of dynamic B+ is increased, the number of stored electrical charge carriers is increased and curve 40 assumes the position of curve 42. As the magnitude of the dynamic B+ applied to the slab of material 12 increases further and the proportion of the voltage across the slab of material increases, regeneration causes a part of curve 42 to assume the position of OA of curve 43. As the voltage across the slab of material increases still further, regeneration is increased until with sufficient regeneration negative resistance appears at point A on the curve 43. Thereafter, increased voltage across slab of material 12 will form the negative resistance portion AB of curve 43.

Figure 7:
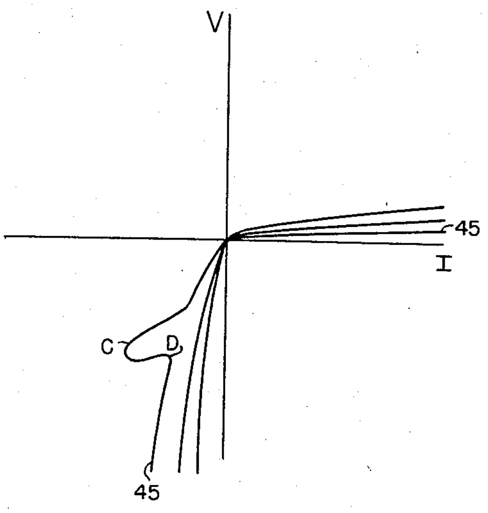
Fig. 7 represents a family of voltage-current characteristic curves including a negative resistance curve of the slab of material shown in Fig. 1 when the magnetic field is applied in a direction opposite to the direction employed in Fig. 6.

When the double-throw, double pole switch is thrown to the second position and the operations indicated in connection with the family of curves shown in Fig. 6 are repeated, the family of voltage current curves shown in Fig. 7 is obtained. It is noted that this family of curves includes curve 45 having a negative resistance portion CD.

Referring to Fig. 8, it is noted that load line X is drawn on a negative resistance, voltage current characteristic curve 50 that may be representative of the circuit shown in Fig. 1 when the double-pole, double-throw switch 23 is in the first position and that load line Y is drawn on a negative resistance curve 51 that may be representative when double-pole, double-throw switch 23 is in the second position. Load line X is drawn through a point on the voltage ordinate in Fig. 8 that is determined by the bias applied to slab 12 in Fig. 1 by the source of direct current voltage at an angle $\theta$ whose cotangent is equal to the value of variable resistor 13 and the impedance of the slab when the double-pole, double-throw switch is in the first position, assuming that other impedances in the circuit are negligible. It is noted that the load line X intersects negative resistance curve 50 in regions where the slope of the curve is negative as well as positive. The points of intersection in the positive region represent stable states of operation for the multistable circuit shown in Fig. 1. In a similar manner, load line Y is drawn on the negative resistance curve 51 and the intersection of the load line in positive region of the negative resistance curve represents stable states of operation for the multistable circuit shown in Fig. 1.

It is readily apparent, therefore, that the multistable circuit shown in Fig. 1 may be triggered from one stable state to another by the magnitude and the voltage applied to a selected element of slab of material 12. The multistable circuit shown in Fig. 1 may, likewise, be triggered by varying the slope of load line X or Y, or by varying the phase or the duration of signals applied to the slab, by varying the bias, by varying the magnitude and polarity of magnetic field applied to the slab of material 12, or by varying the direction in which the source of potential is applied to the slab.

Similar load lines could be drawn on appropriate negative resistance curves for the multistable circuits shown in Fig. 2, and the multistable circuit shown in Fig. 2 could be triggered to a desired stable state in any one of the various methods described in connection with Fig. 1.

Various modifications are contemplated and may obviously be resorted to by those skilled in the art without departing from the spirit and scope of the invention as hereinafter defined by the appended claims, as only a preferred embodiment thereof has been disclosed.

What is claimed is:

1. In a multistable circuit having a plurality of stable states, a slab of material having a first axis and a second axis, said slab having two opposite surfaces, each having an angular intersection with said first axis, said two opposite surfaces having predetermined pairs of regions, the first of each of said pairs of regions being manufactured in a manner different than and located on a different one of said two opposite surfaces than the second of each of said pairs of regions, a plurality of signal sources, means for connecting each of said plurality of signal sources to a respective one of said pairs of regions, means for applying a desired magnetic field along the first axis, means for inducing a predetermined drift field along the second axis, means connected to the slab for maintaining a steady state of electrical charge carriers in the slab, an output circuit, and means for connecting the output circuit to the slab.

2. In a multistable circuit having a plurality of stable states, a slab of material having a first axis and a second axis and including means for storing a steady state of electrical charge carriers having a lifetime whose reciprocal is less than a selected frequency, said slab having two opposite surfaces, each having an angular intersection with said first axis, said two opposite surfaces having predetermined pairs of regions, the first of each of said pairs of regions being manufactured in a manner different than and located on a different one of said two opposite surfaces than the second of each of said pairs of regions, a plurality of signal sources, means for connecting each of said plurality of signal sources to a respective one of said pairs of regions, means for applying a desired magnetic field along the first axis, means for inducing a predetermined drift field along the second axis, a source of high frequency energy producing a series of signals of said selected frequency, means for connecting said source of high frequency energy to the slab, an output circuit, and means for connecting the output circuit to said slab.

3. In a multistable circuit having a plurality of stable states, a slab of material having a first axis and a second axis and including means for storing a steady state of electrical charge carriers having a lifetime whose reciprocal is less than a selected frequency, said slab having two opposite surfaces, each having an angular intersection with said first axis, said two opposite surfaces having predetermined pairs of regions, the first of each of said pairs of regions being manufactured in a manner different than and located on a different one of said two opposite surfaces than the second of each of said pairs of regions, a plurality of signal sources, means for connecting each of said signal sources to a respective one of said pairs of regions, means for applying a desired magnetic field along the first axis, means for inducing a predetermined drift field along the second axis, a source of high frequency energy producing a series of signals having at least frequency, phase, duration and magnitude as parameters, means connected to the source of high frequency energy for triggering said multistable circuit to at least a selected one of said plurality of stable states by varying a desired one of said parameters, means for connecting the source of high frequency energy along the first axis, an output circuit, and means for connecting the output circuit to the slab.

4. In a multistable circuit having a plurality of stable states, a slab of material, said slab having two opposite surfaces, each having an angular intersection with said first axis, said two opposite surfaces having predetermined pairs of regions, the first of each of said pairs of regions being manufactured in a manner different than and located on a different one of said two opposite surfaces than the second of each of said pairs of regions, a plurality of signal sources, means for connecting each of said plurality of signal sources to a respective one of said pairs of regions, means for applying a desired magnetic field to said slab in a first direction, means for applying a desired magnetic field to said slab in a direction opposite to said first direction, means for inducing a predetermined drift field in said slab in a second direction, means for inducing said predetermined drift field in said slab in a direction opposite to the second direction, means connected to said slab for maintaining a steady state of electrical charge carriers in the slab, an output circuit, and means connecting the output circuit to the slab.

References Cited in the file of this patent

UNITED STATES PATENTS

| | | |
|---|---|---|
| 1,778,796 | Craig | Oct. 21, 1930 |
| 2,736,822 | Dunlap | Feb. 28, 1956 |
| 2,843,765 | Aigrain | July 15, 1958 |
| 2,852,732 | Weiss | Sept. 16, 1958 |

OTHER REFERENCES

"The Hall Effect and Its Uses," by T. R. Lawson, Westinghouse Engineer, May 1957, pp. 71–73.